United States Patent
Daliyot

(10) Patent No.: US 10,489,659 B2
(45) Date of Patent: Nov. 26, 2019

(54) SYSTEM AND METHOD FOR SEARCHING VIDEO

(71) Applicant: Verint Americas Inc., Alpharetta, GA (US)

(72) Inventor: Shahar Daliyot, Ramot Meir (IL)

(73) Assignee: VERINT AMERICAS INC., Alpharetta, GA (US)

( * ) Notice: Subject to any disclaimer, the term of this patent is extended or adjusted under 35 U.S.C. 154(b) by 15 days.

(21) Appl. No.: 15/258,020

(22) Filed: Sep. 7, 2016

(65) Prior Publication Data

US 2018/0068189 A1 Mar. 8, 2018

(51) Int. Cl.
| | |
|---|---|
| *G06K 9/00* | (2006.01) |
| *G11B 27/34* | (2006.01) |
| *H04N 5/247* | (2006.01) |
| *G06F 3/0482* | (2013.01) |
| *G11B 27/10* | (2006.01) |
| *H04N 5/77* | (2006.01) |
| *H04N 5/91* | (2006.01) |
| *H04N 21/00* | (2011.01) |
| *G06F 3/0484* | (2013.01) |
| *G06T 7/00* | (2017.01) |
| *G06F 16/40* | (2019.01) |
| *G08B 13/196* | (2006.01) |

(52) U.S. Cl.
CPC ....... *G06K 9/00765* (2013.01); *G06F 3/0482* (2013.01); *G06F 3/04842* (2013.01); *G06F 16/40* (2019.01); *G06K 9/00744* (2013.01); *G06K 9/00771* (2013.01); *G06T 7/0008* (2013.01); *G11B 27/102* (2013.01); *G11B 27/34* (2013.01); *H04N 5/247* (2013.01); *H04N 5/77* (2013.01); *H04N 5/91* (2013.01); *H04N 21/00* (2013.01); *G08B 13/19682* (2013.01)

(58) Field of Classification Search
CPC ............... G06K 9/00765; G06K 9/325; G06K 9/00664; G08B 13/19645; G11B 27/031; G11B 27/22; G11B 27/34; G11B 27/36; G11B 27/005; G11B 31/006; G06F 3/0482; G06T 7/0022; H04N 5/76; H04N 5/247
USPC ....................................................... 386/226
See application file for complete search history.

(56) References Cited

U.S. PATENT DOCUMENTS

2003/0147480 A1* 8/2003 Richards ............ H04B 1/71637
375/343
2008/0204569 A1* 8/2008 Miller ................. G06F 17/3079
348/222.1

(Continued)

*Primary Examiner* — Loi H Tran
(74) *Attorney, Agent, or Firm* — Meunier Carlin & Curfman LLC

(57) ABSTRACT

A system and method for searching a video stream collected by a camera in a video surveillance system for an object's placement or displacement is disclosed. The searching includes an interactive question/answer approach that allows for a video snippet including the object's placement or displacement to be found quickly without the need for complicated video analytics. During the search, frames from algorithmically selected points in the video stream are presented to a user for review. The user reviews each frame and indicates if he/she sees the object. Based on the user's response the searching algorithmically reduces the portion video stream that is searched until a snippet of a video is found that includes the object's placement or displacement.

20 Claims, 11 Drawing Sheets

(56) References Cited

U.S. PATENT DOCUMENTS

| | | | |
|---|---|---|---|
| 2008/0226127 A1* | 9/2008 | Brodsky | G06K 9/32 |
| | | | 382/103 |
| 2013/0148898 A1* | 6/2013 | Mitura | G06K 9/62 |
| | | | 382/195 |
| 2015/0354973 A1* | 12/2015 | Wang | G01C 21/30 |
| | | | 701/410 |
| 2017/0085714 A1* | 3/2017 | Casasola | H04M 3/527 |
| 2017/0243066 A1* | 8/2017 | Yaguchi | G06K 9/00765 |
| 2018/0052515 A1* | 2/2018 | Wanner | G06K 9/00597 |

* cited by examiner

SYSTEM AND METHOD FOR SEARCHING VIDEO

FIELD OF THE INVENTION

The present disclosure relates to video surveillance systems and more specifically, to a method for searching video acquired by cameras in the surveillance system to find a segment of video (i.e., a video snippet) that includes the point in the video stream at which an object was placed in, or removed from, an area imaged by the camera.

BACKGROUND

Finding a point in time at which an object was left in a scene or taken from the scene is a very common task for video security officers and investigators. Traditionally, video management software (VMS) provides a security officer with a graphical user interface (i.e., GUI) having tools (e.g., a movable playhead, a fast forward button, rewind button, etc.) for manually searching recorded video. To search, a playhead may be moved (e.g., via a drag operation) over a graphical representation of a video stream (i.e., slider) to any point (i.e., time) in the video stream. In addition, searching may include using a fast-forward (i.e., FF) button or a rewind (i.e., RW) button to playback the video in a forward or backward direction, and in some cases, searching may include adjusting playback speed for a normal or higher (e.g., ×2, ×4, ×8, etc.) rate.

Traditional controllers may be inefficient and cumbersome for searching long video streams, especially when the current time stamp is well separated from the point (i.e., search-point) in the video stream at which the object appeared or disappeared. As a result, a user must often perform numerous control operations to hunt for the search-point. At the same time, the user must remember what time points have been searched to rule out portions of the video stream in order to find the search point. This approach may result in long searches that frustrate the user and take the user's attention away from other security duties.

Searching the video stream may be automated using video analytics. Video analytics utilize recognition algorithms that detect the characteristics (e.g., pixel level, color, shape, size, etc.) of an object and/or area to find a specified search-point. Automated searches using video analytics in a video surveillance application are complicated and computationally expensive for a variety of reasons. For example, an auto-mated-search algorithm must accommodate changes in the lighting conditions (e.g., day/night) of an object/area during the video stream to prevent search errors. In addition, an automated-search algorithm must accommodate changes to the object (e.g., position, partial obscuration, etc.) during the video stream to prevent search errors. Further, an automated-search algorithm must be fast enough to make an automated search of a long video stream more useful than a manual search of the long video stream.

A need, therefore, exists for a system and method to search a video stream for an object's appearance or disappearance using a hybrid (i.e., interactive) approach that combines the best aspects of automated and manual searching, while mitigating the drawbacks of each.

SUMMARY

Accordingly, in one aspect, the present disclosure embraces a method for searching video from a camera in a surveillance system for a snippet of video showing an object's placement or displacement. The method includes providing a graphical user interface (e.g., enabled by a computer connected to a video surveillance system and running video management software) for a user to interact with a video stream (e.g., recorded video) from the camera in the video surveillance system. The method further includes the steps of presenting the video stream to a user via the GUI (e.g., in a viewing tile), and receiving a selection from a user via the GUI (e.g., a drop down menu initiated by a right click on the viewing tile). The selection from a user initiates either (i) a search of the video stream for an object's placement (e.g., "who put it there") or (ii) a search of the video stream for an object's displacement (e.g., "who took it"). After the user selects a search, the method includes the step of performing an iterative search of the video stream. At each iteration of the search, a frame from a point in the video stream is presented in the GUI (e.g., in the viewing tile) along with a dialog. The dialog "asks" the user if the object is visible in the presented frame. In response, a user inputs an indication that the object is visible or not visible in the presented frame. The iterative search returns a video snippet (i.e., segment of the video stream) that is presented in the GUI (e.g., in the tile) to show the object's placement or displacement (i.e., depending on which search was selected).

In another aspect, the present disclosure embraces a video surveillance system. The system includes a network of video cameras and a recorder that records video streams from the cameras. The system further includes a computing device that is communicatively coupled to the network of video cameras and to the recorder. The computing device is configured by software to search video from a camera for a snippet of video showing an object's placement or displacement. To execute the search, the computing device is configured by software to perform the operations in the method for searching video from a camera in a surveillance system for a snippet of video showing an object's placement or displacement, as described above.

In an exemplary embodiment of the method or system, the object is not selected for the iterative search. For example, only the input from the user, which indicates that the object is visible or not visible in the presented frames, determines the results (i.e., the video snippet) returned by the iterative search.

In another exemplary embodiment of the method or system, the iterative search includes an initial-interval search that returns an initial search interval (Ti), which specifies a portion of the video stream that includes the object's placement or displacement. The iterative search also includes a snippet search that follows the initial-interval search. The snippet search returns a refined search interval (Tr) that is smaller than Ti but also includes the object's placement or displacement (i.e., Tr<Ti).

In a possible embodiment, the initial-interval search begins at the current point in the video stream and iterates by successively jumping backwards/forwards in the video stream. The successively jumping backwards/forwards continues (i.e., iterates) until the input from the user via the GUI indicates that the object is not visible in the frame (i.e., for a search of the video stream for an object's placement) or until the input from the user via the GUI indicates that the object is visible in the frame (i.e., for the search of the stream for an object's displacement). In one possible embodiment, each successive jump backwards/forwards is twice the length of the previous iteration's jump backwards/forwards. In another possible embodiment, the initial interval returned by the initial-interval search is the portion of the video stream spanned by the final jump in the succession of jumps.

In a possible embodiment, the snippet search begins at an endpoint of the initial search interval (Ti) and iterates by successively reducing (i.e., refining) the initial search interval based on the input from a user. The search interval successively reduced on each iteration until a refined search interval is returned that is equal to or less than a snippet threshold.

In a possible embodiment, each iteration of the snippet search returns a refined search interval that is one-half the length of the previous iteration's search interval.

In a possible embodiment, the refined search interval returned by the final iteration of the snipped search determines the video snippet presented in the GUI.

The foregoing illustrative summary, as well as other exemplary objectives and/or advantages of the disclosure, and the manner in which the same are accomplished, are further explained within the following detailed description and its accompanying drawings.

DETAILED DESCRIPTION

The present disclosure embraces search features for a video surveillance system with video management software (VMS) for interacting with cameras and recorders.

Figure 1:
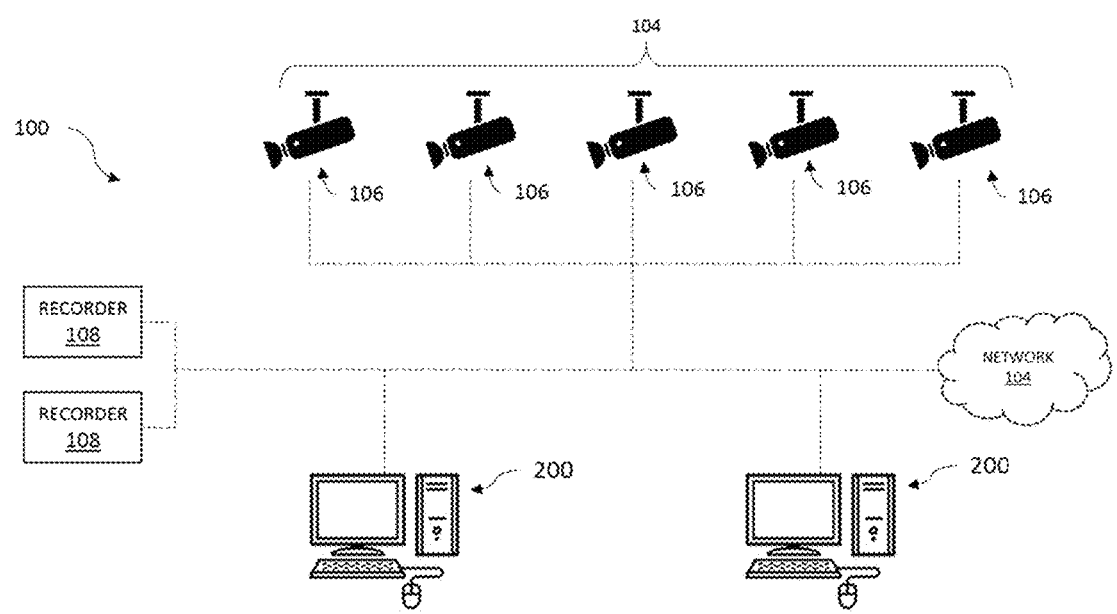
FIG. 1 schematically depicts a video surveillance system according to an exemplary embodiment of the present disclosure.

An exemplary surveillance system is shown in FIG. 1. The system includes a network of video cameras 104 (i.e., cameras) that communicate to one or more computers 200 and, in some embodiments, to one or more recorders 108. Each camera 106 may transmit video in analog format (e.g., NTSC, PAL, RGB, etc.) or digital format (e.g., MPEG, H.264, JPEG video, etc.). The digital formatted video may be communicated over a communication medium (e.g., as coax, wireline, optical fiber, wireless), or a combination of communication media, using a communication protocol (e.g., TCP/IP).

Each camera 106 in the network 104 is typically installed in fixed locations around a monitored area. In some embodiments, a camera 106 may be remotely controlled by a computer 200. The control signals can facilitate a change in the camera's settings (e.g. focus, illumination, zoom) and/or the camera's position (e.g., by panning and/or tilting).

The surveillance system 100 may include one or more recorders 108 that receive and record video streams from each camera 106. A recorder may be analog but typically, a digital video recorder (DVR) is used. In one possible embodiment, a recorder 108 is located at a site that is located away from the site (e.g., facility) in which the camera network 104 is installed. In this case, the recorder site may communicate with the camera network site via a network 104. In another possible embodiment, a recorder 108 may be integrated with a computer 200. The recorder 112 may be configured to record video streams from each camera 106 and may be configured to play back the recorded video stream on one or more of the computers 200.

The logical operations described herein with respect to the various figures may be implemented (i) as a sequence of computer implemented acts or program modules (i.e., software) running on a computer (e.g., the computer described in FIG. 2), (ii) as interconnected machine logic circuits or circuit modules (i.e., hardware) within the computer and/or (iii) as a combination of software and hardware of the computer. Thus, the logical operations discussed herein are not limited to any specific combination of hardware and software. The implementation is a matter of choice dependent on the performance and other requirements of the computer. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in a different order than those described herein.

Figure 2:
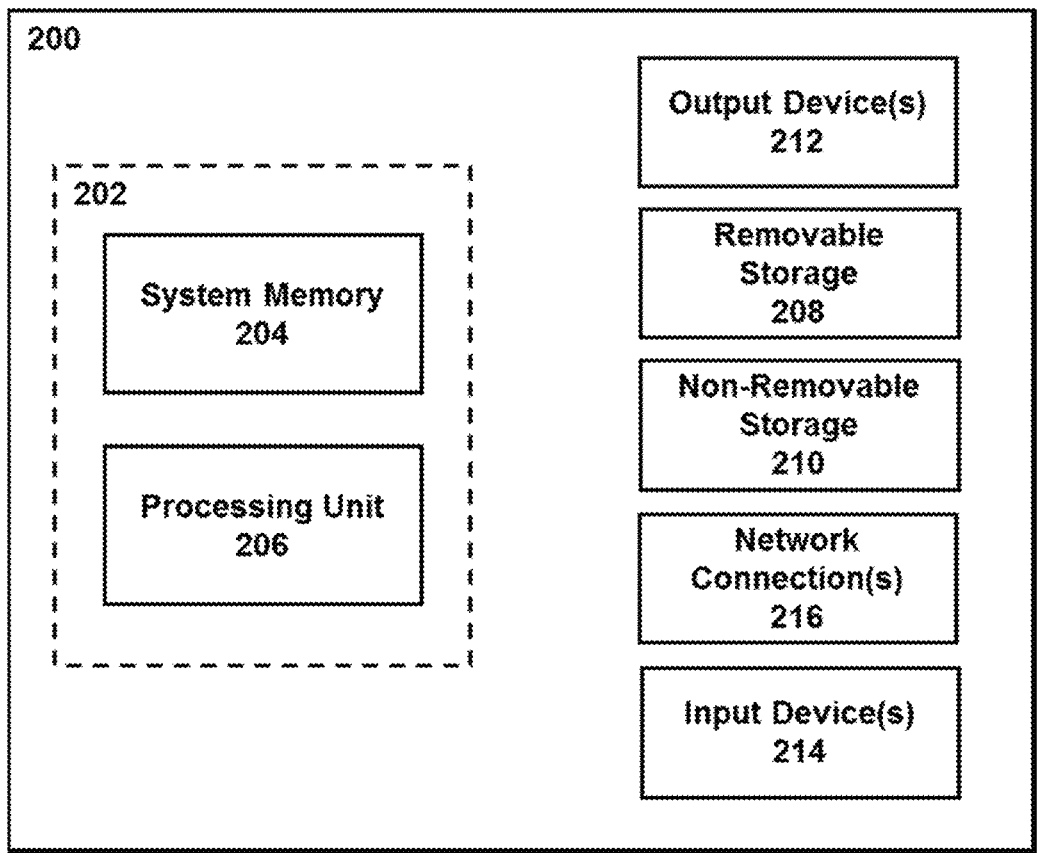
FIG. 2 graphically depicts a computer for executing an iterative search of a video stream from a video surveillance system according to an exemplary embodiment of the present disclosure.

Referring to FIG. 2, an example computer 200 upon which embodiments of the disclosure may be implemented is illustrated. It should be understood that the example computer 200 is only one example of a suitable computing environment upon which embodiments of the disclosure may be implemented. Optionally, the computer 200 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computers, which are connected to a communication network or other data transmission medium, to perform various tasks. In the distributed computing environment, the program modules, applications, and other data may be stored on local and/or remote computer storage media.

In its most basic configuration, a computer 200 typically includes at least one processing unit 206 and system memory 204. Depending on the exact configuration and type of computer, system memory 204 may be volatile (such as random access memory (RAM)), non-volatile (such as read-only memory (ROM), flash memory, etc.), or some combination of the two. This most basic configuration is illustrated in FIG. 2 by dashed line 202. The processing unit 206 may be a standard programmable processor that performs arithmetic and logic operations necessary for operation of the computer 200. The computer 200 may also include a bus or other communication mechanism for communicating information among various components of the computer 200.

A Computer 200 may have additional features and/or functionality. For example, computer 200 may include additional storage such as removable storage 208 and non-removable storage 210 including, but not limited to, magnetic or optical disks or tapes. A Computer 200 may also contain network connection(s) 216 that allow the device to communicate with other devices. A Computer 200 may also have input device(s) 214 such as a keyboard, mouse, touch screen, etc. Output device(s) 212 such as a display, speakers, printer, etc. may also be included. The additional devices may be connected to the bus in order to facilitate communication of data among the components of the computer 200. All these devices are well known in the art and need not be discussed at length here.

The processing unit 206 may be configured to execute program code encoded in tangible, computer-readable media. Tangible, computer-readable media refers to any media that is capable of providing data that causes the computer 200 (i.e., a machine) to operate in a particular fashion. Various computer-readable media may be utilized to provide instructions to the processing unit 206 for execution. Example tangible, computer-readable media may include, but is not limited to, volatile media, non-volatile media, removable media, and non-removable media implemented in any method or technology for storage of information such as computer readable instructions, data structures, program modules or other data. System memory 204, removable storage 208, and non-removable storage 210 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 206 may execute program code stored in the system memory 204. For example, the bus may carry data to the system memory 204, from which the processing unit 206 receives and executes instructions. The data received by the system memory 204 may optionally be stored on the removable storage 208 or the non-removable storage 210 before or after execution by the processing unit 206.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computer generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language and it may be combined with hardware implementations.

The video surveillance system may execute video management software (VMS) running on the computer 200. The VMS allows an operator to interact with the cameras 106 and the recorders 112 via a graphical user interface (GUI).

Figure 3:
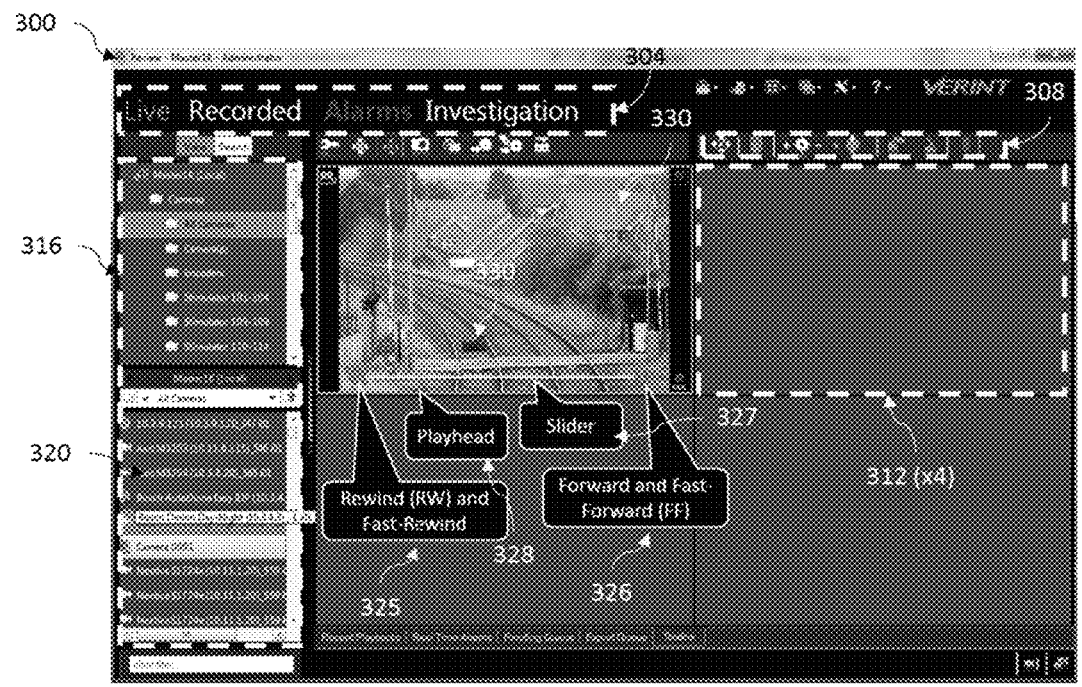
FIG. 3 graphically depicts a graphical user interface (GUI) for interacting with video streams from a video surveillance system according to an embodiment of the present disclosure.

An exemplary GUI 300 is shown in FIG. 3. In the GUI, a navigation toolbar 304 allows a user to select various modes of operation. The modes include (but are not limited to) "live" for viewing live video from a selected camera, "recorded" for viewing video from a selected camera recorded on a recorder, "alarms" for working with alarms associated with the video, and "investigation" for analyzing video. Also in the GUI, a workspace toolbar 308 allows a user controls cameras and display features for each camera. Also in the GUI, a navigation pane 316 that displays icons (e.g., folders, cameras, tours, maps, monitors, bookmarks, alarms, investigation attachments, etc.) to select and control components of the surveillance system.

The GUI's viewing area (i.e., workspace) is divided into video viewing tiles (i.e., viewing tiles, tiles, etc.) 312. The workplace shown in FIG. 3 has four tiles 312, one of which (i.e., upper left) displays video from a camera. The video tiles allow for viewing live and recorded video but may also display images, as will be described further herein. The GUI's workspace may hold a plurality of video tiles (e.g., up to 64 tiles). The number and configuration of the video tiles may be controlled by a user in possible embodiments. Controls are typically provided for each tile. A user can interact (i.e., tap, click, drag-drop, etc.) with the controls to view a video stream from a camera or recorder. The controls may include a slider 327 that represents the video stream of the camera. Earlier points in the video stream are typically positioned on the slider as left from later points. The controls may also include a movable playhead 328. The playhead's position corresponds to the point in the video stream that is displayed in the tile and may, in some cases, be moved to adjust the point at which the video stream is view. The controls may also include a fast-forward (FF) button 325 and a rewind (RW) button 326 that cause the video to jump or move quickly in either a forward or a reverse direction. In some cases, the speed (etc. 2×, 4×, etc.) of the forward and reverse play may be adjusted using these controls (e.g., multiple activations of the button). The controls may include more advanced video viewing options, such as full-screen viewing and last N-minutes playback, which are activated through menus and/or dialogs.

It is often necessary to search video for a particular event. These events may include a change in an object observed in an imaged scene (e.g., the object has be left unattended in an area, an object has been removed from an area) or a change in the scene itself (e.g., a wall has been marked with graffiti). For example, FIG. 3 illustrates a frame from a video showing a trashcan on a train track. A user monitoring the video may observe the video after the event (i.e., the trashcan moved on the tracks) has occurred. As a result, the user may wish to know when the trashcan was placed on the track and who placed the trashcan on the track. As a result, the user may search the video to find the point in the video stream at which the object was placed in the scene and then observe the video stream just before and just after the event to understand the event better. This understanding may help the user make an appropriate decision or take an appropriate action.

The present disclosure embraces an interactive search that allows the user to quickly find the video snippet containing the event. The interactive search uses responses from the user to efficiently rule in/out portions of the video stream that are/are-not likely to contain the event. The user is not required to apply special attention to the slider (or time stamps) during the search, but rather to indicate that they can see or not see the object (i.e., search target) in automatically selected frames from various time points in the video stream. Further, since the user is performing the recognition of the object in video frames, no advanced video analytics are necessary. In other words, the search algorithms do not require foreknowledge of the object for the search. Instead, the yes/no answers from the user provide all the necessary feedback for the algorithm to return the appropriate video snippet.

Figure 4:
FIG. 4 graphically depicts a GUI for interacting with an iterative search of a video stream from a video surveillance system according to an embodiment of the present disclosure.

A search may be launched by a user through interaction with the GUI. For example, a user may right click on a video in a tile, as shown to cause a drop down menu 326 appear, as shown in FIG. 4. The menu may include options for a search of the video stream for an objects placement (i.e., "who put it there") and an object's displacement (i.e., "who took it"). While these two searches (i.e., object placement and object displacement) are described, the search algorithms disclosed are versatile and maybe used for other searches. For example, the techniques described herein may be applied generally to any action by an living being (e.g., human, animal, etc.) that leaves a trace (e.g., vandalism, construction, etc.), or to any naturally occurring condition (e.g., lightning, high wind, etc.) that leaves a trace (e.g., burned out light, blown-down tree, etc.). In some cases, animate objects (e.g., humans, animals, robots, etc.) may also be searched, especially if they do not enter or leave the area multiple times during the video stream. In these cases, a user, in a possible embodiment, may further condition the search (e.g., initially limiting the search to a portion of the video). Each and every search for a traceable object or condition occurring in the video stream (and any combination or permutation thereof) are within the scope of the present disclosure.

After the search for either the object's placement or the object's displacement is selected by a user, an iterative search of the video stream is performed. At each iteration, the iterative search algorithm chooses a point in the video stream and presents a frame (i.e., image) from the point in GUI. In addition, a dialog is presented. The dialog may be any text, image, or graphic that conveys information corresponding to the question "do you see the object?". A user responds to the dialog (e.g., by clicking on a "yes" button or "no" button) to indicate that the object is visible or not visible in the frame. In other words, the user replies to the dialog that he/she sees or does not see the object in the image. Based on this response, the algorithms compute the point in the video stream for the next iteration and the process continues. In addition, the algorithms essentially rules in or out segments of the video stream based on the user's response. For example, if the user responds at a current time point that the object is visible and responds at a previous time point that the object is still visible, then the algorithm may rule out the video stream between these two points as containing the object's placement because the object is in both frames.

The iterative search does not need knowledge of the object's visibility at the start of the search because the selection of the search (i.e., object placement or object displacement) essentially provides this information. For example, if a user selects a "who put it there," search, then it is assumed that the user sees the object in the current frame.

Based on the user's input in response to presented frames, the iterative search initially finds a segment of the video stream that is smaller than the entire video stream (which may be very long) but that still contains the object's placement/displacement (i.e., the event). Next, the iterative search successively reduces the segment by ruling in/out portions of the segment based on the user's input until a segment that is of a snippet length is found to contain the event.

Figure 5:
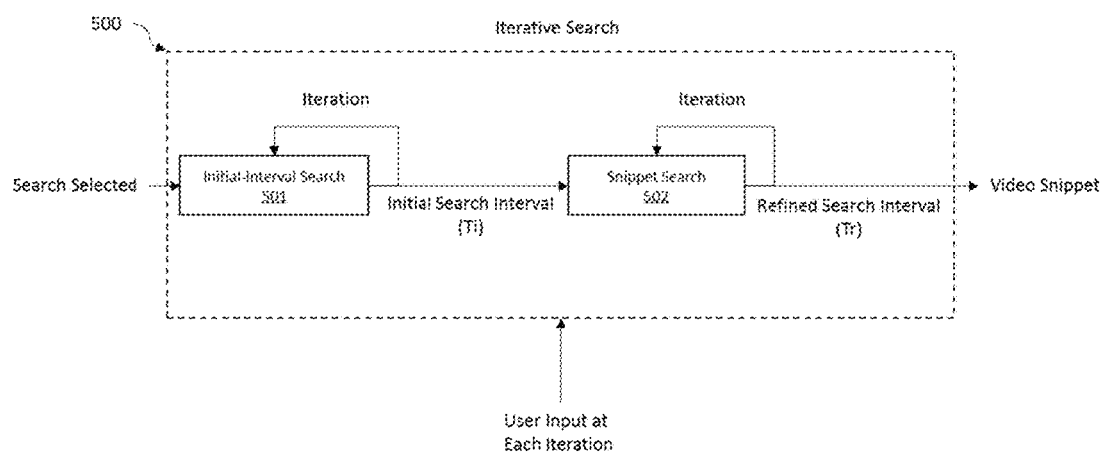
FIG. 5 graphically depicts a flow chart of an exemplary iterative search of a video stream for a video snippet showing an object's placement or displacement according to an embodiment of the present disclosure.

FIG. 5 illustrates the iterative search 500 according to an embodiment of the present disclosure. The iterative search includes an initial-interval search 501 that returns an initial search interval (Ti). Ti is then used as the starting point for a snippet search 502. At each iteration (i.e., for each user input) the snippet search forms a refined search interval. As the snippet search iterates, the refined search interval (Tr) is reduced (e.g., cut in half) based on the user input. The snippet search concludes when the Tr is less than or equal to a pre-defined snippet length (i.e., snippet threshold). The result of the iterative search is a video snippet corresponding to the refined search interval.

Figure 6A:
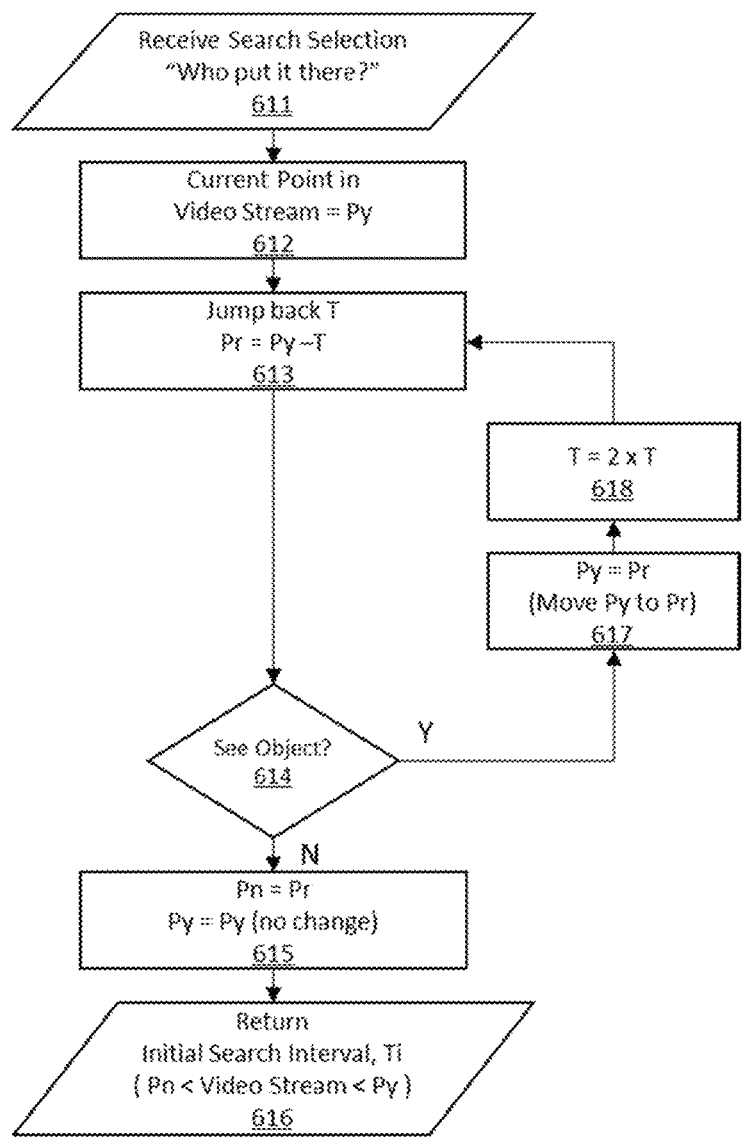
FIG. 6A is a flowchart of an exemplary initial-interval search that is part of an iterative search for an object's placement according to an embodiment of the present disclosure.

FIG. 6A is a flowchart illustrating the steps of an exemplary initial-interval search 501 that is part of an iterative search for an object's placement (i.e., "who put it there"). After the selection of the search is made 611, the current point in the video stream (i.e., current time stamp) is marked as a "yes-point" (i.e., Py) 612. The "yes-point" is the point in the video stream at which the object is verified as visible. Next, a frame from the video stream at an earlier point is displayed. The earlier point is marked as a "review point" (i.e., Pr). In other words, the method "jumps back" in the video stream from Py to Pr by a period, T, (Pr=Py−T). Initially, the period may be any value (e.g., 1 hour). The user then indicates if the object is seen at Pr 614. If the object is seen, then the "review point" becomes the new "yes point" 617 (i.e., the object is verified as visible). The old Py is disregarded and Py is essentially moved to Pr (i.e., Py=Pr). In addition, the period is doubled (i.e., T=2×T) for the next iteration 618. In the next iteration, a new Pr is found by successively "jumping back" in the in the video stream from the new Py to the new Pr using the new jump period 613. The method iterates in this fashion until the user indicates that the object is not seen at Pr 614. When the user indicates that the object is not seen at Pr, then the "review point" Pr becomes a "no point" (Pn) (i.e., Pn=Pr) 615. After Pn is discovered, an initial search interval may be defined from the "no point" (i.e., the object is verified as not visible) to the "yes point" 616 (i.e., the object is verified as visible). The initial search interval (i.e., Ti) is the portion of the video stream that includes the point at which the object was placed in the scene (i.e., Pn<search point<Py).

Figure 7A:
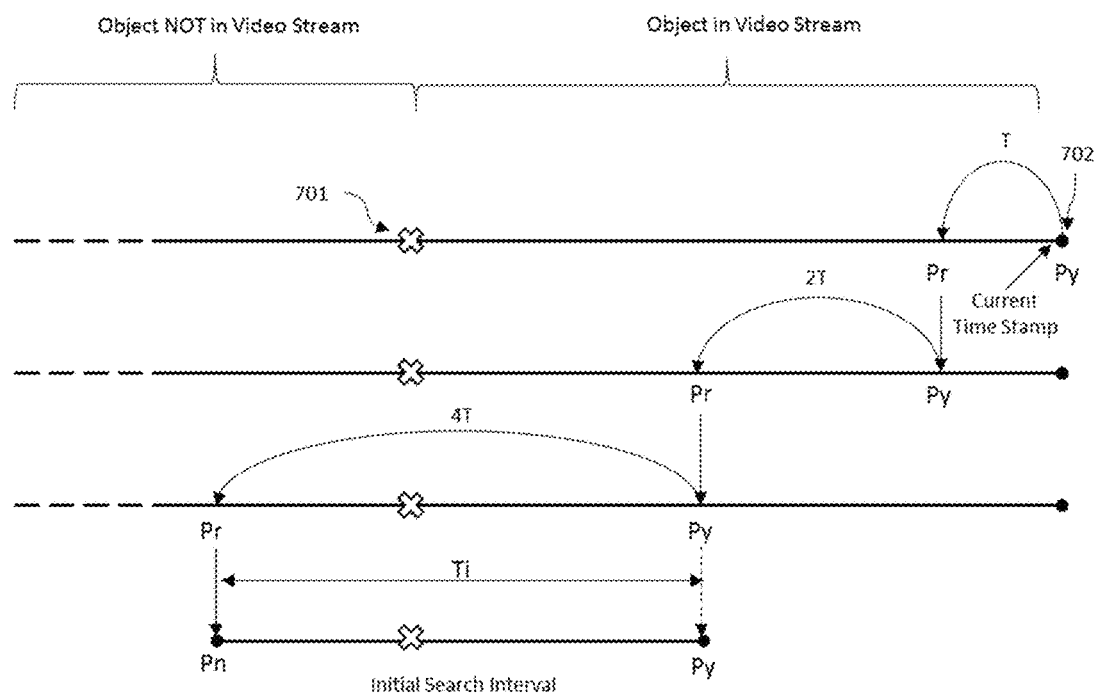
FIG. 7A is a graphical illustration of an exemplary implementation of an initial-interval search that is part of an iterative search for an object's placement according to an embodiment of the present disclosure.

FIG. 7A graphically illustrates the initial-interval search 501 described above for an exemplary video stream. Because the period T doubles on each iteration, the object's placement 701 may be easily found in a few iterations even when the object occurred much earlier than the current time stamp 702. For example, when the object's placement occurred 6 hours in the past, the initial-interval search only requires three iterations. Because at each iteration prior to the last Pr is assigned Py, the Ti is guaranteed never to be larger than the last iteration's jump back. For example, when the object's placement occurred 6 hours in the past the initial search interval (Ti) is 4 hours. Adding to the method's efficiency, it does not matter where in the initial search interval that the object's placement (i.e., search point) 701 occurs.

Figure 6B:
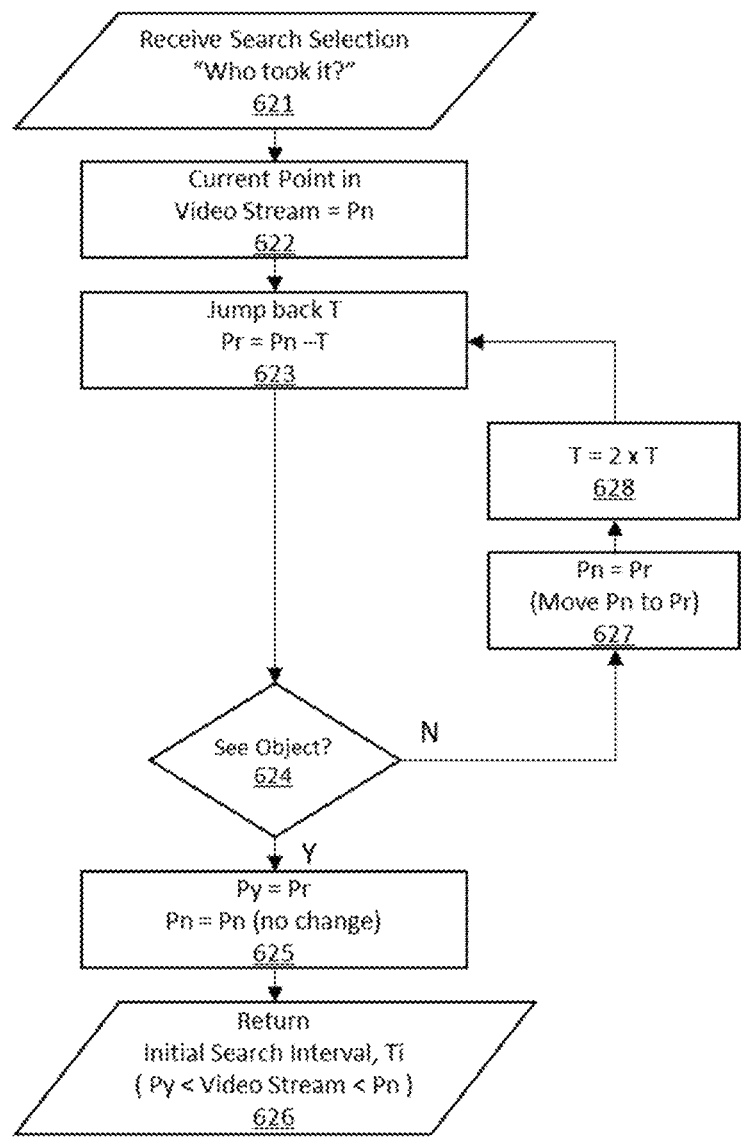
FIG. 6B is a flowchart of an exemplary initial-interval search that is part of an iterative search for an object's displacement according to an embodiment of the present disclosure.
Figure 7B:
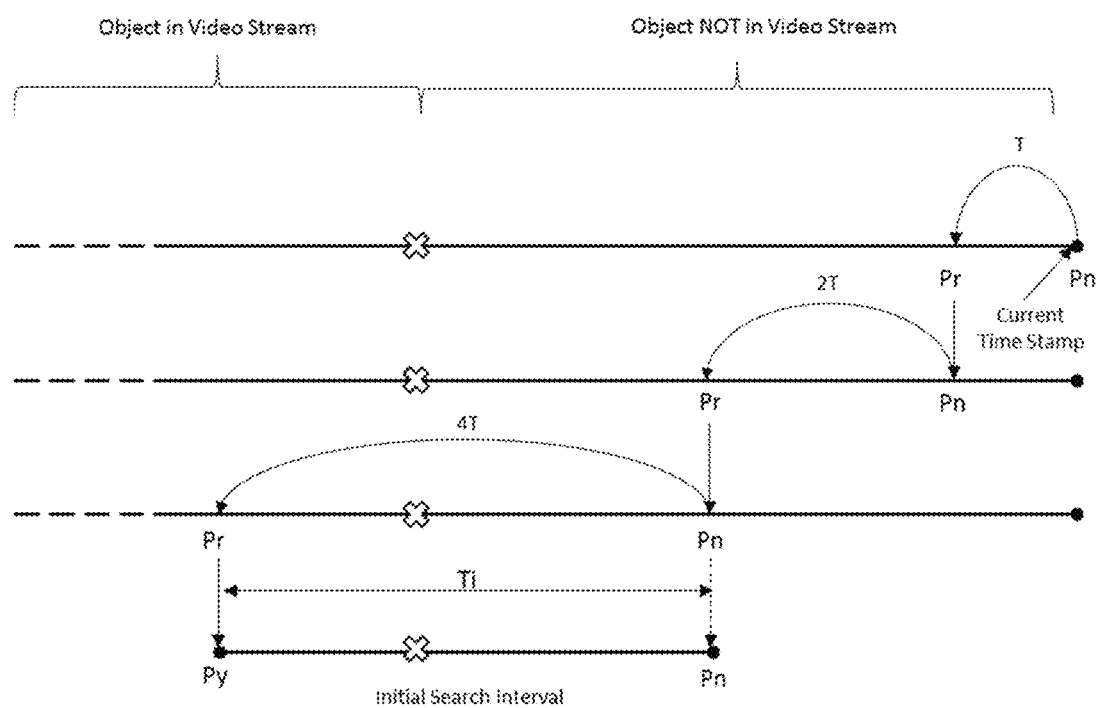
FIG. 7B is a graphical illustration of an exemplary implementation of an initial-interval search that is part of an iterative search for an object's displacement according to an embodiment of the present disclosure.

FIG. 6B is a flowchart illustrating the steps of an exemplary initial-interval search that is part of a search for an object's displacement (i.e., "who took it"). The method is similar to the method described previously for an object placement search (i.e., FIG. 7A). Here, however, the current point in the video stream is verified (i.e., via the search selection) as a point in the video stream at which the object is not visible, that is the current time stamp is a "no-point" (i.e., Pn) 621. Further, the initial-interval search iterates until the user verifies that the object is seen, making the initial search interval span from the "yes-point" to the "no point" in the final iteration (i.e., Py<search point<Pn) 626. FIG. 7B graphically illustrates the initial-interval search process for an object displacement (i.e., "who took it") search, as described above for an exemplary video stream.

Figure 8:
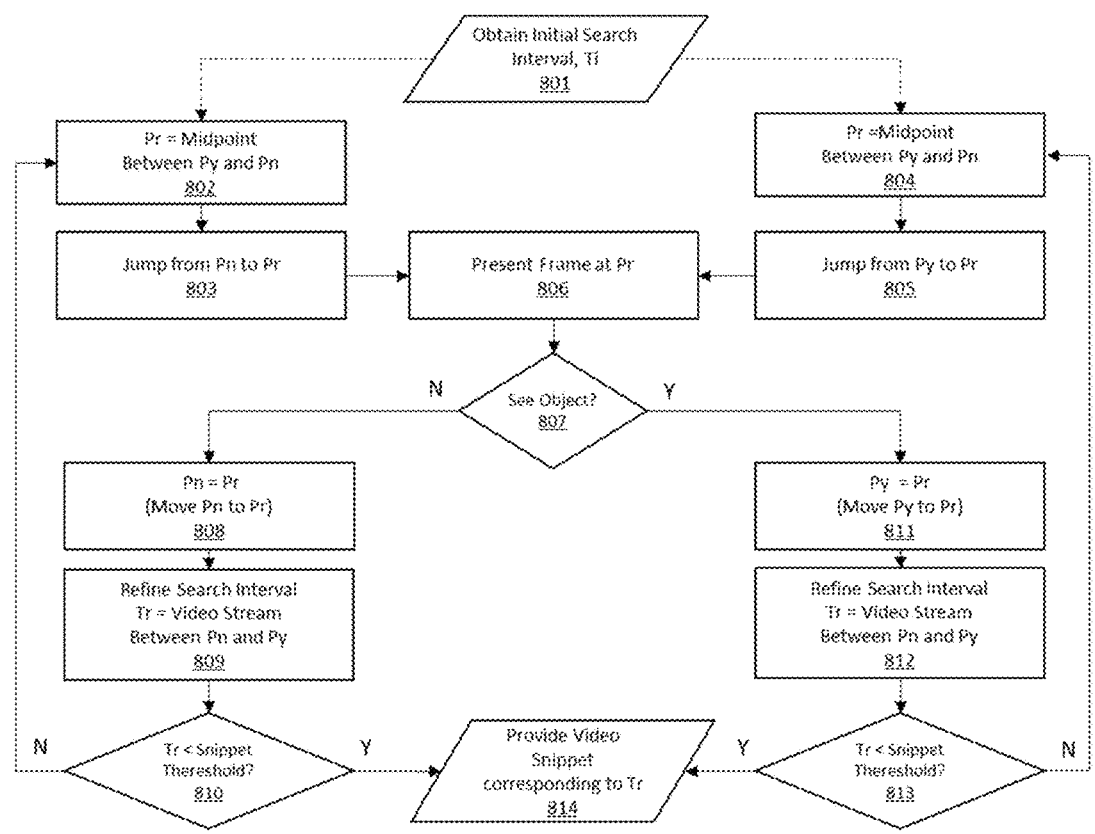
FIG. 8 is a flowchart of an exemplary snippet search that is part of an iterative search for an object's placement or displacement according to an embodiment of the present disclosure.

FIG. 8 is a flowchart illustrating the step of an exemplary snippet search 502 that is part of an iterative search for either the object's placement or displacement. The snippet search receives the initial search interval, Ti, 801. Typically, Ti is received from the initial-interval search 501 as shown in FIG. 5 but, in a possible embodiment, could be received from another source, such as a user selection. The snippet search begins by jumping from either end point (i.e., Py, Pn) of Ti to a "review point", Pr, midway between Py and Pn 802, 803, 804, 805. The frame Pr is presented in the GUI 806, and an indication (i.e., feedback) of whether or not the user sees the object is received 807. Based on the input from the user, half of the initial search interval may be ruled in or out and the resulting search interval is refined (i.e., reduced).

Figure 9:
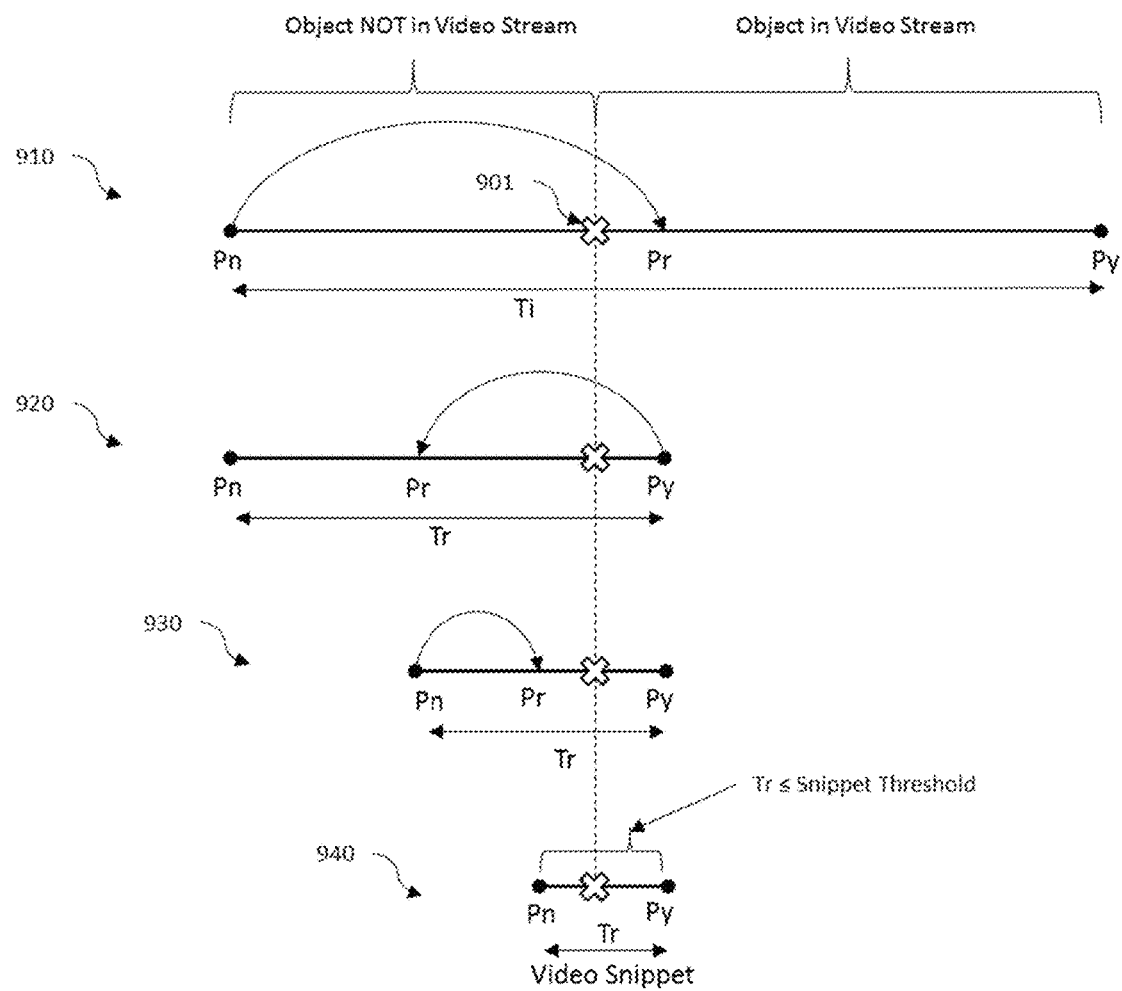
FIG. 9 is a graphical illustration of an exemplary implementation of a snippet search according to an embodiment of the present disclosure.

FIG. 9 illustrates an implementation of the snippet search as shown in FIG. 8 for an exemplary search for an object's placement. In a first iteration of the snippet search 910, the initial search interval Ti is received 801 as spanning from Pn to Py. A review point, Pr, is defined midway between Pn and Py (i.e., Pr=(Py−Pn)/2) 802. The search jumps from Pn to Pr 803 and presents the frame in the video stream corresponding to Pr 806. A user indicates that the object is seen at Pr 807. As a result, Pr is assigned as the new Py 811 and the search interval is reduced to span the video stream between Pn and the new Py. In other words, because the jump was from Pn (i.e., a point at which the object is not visible) to a point at which the object is verified as visible, the jump spanned the point of the object's placement 901, and only this portion of the search interval needs to be retained. As a result, a refined search interval, Tr, is created 812 that includes only the portion with the object's placement 901; the other portion is eliminated from the search. At this point, the refined search interval (i.e., the length) is compared to a snippet threshold 813. A snippet threshold may be any value suitable for a user to witness the scene just before and just after the object's placement 901 (e.g., 20 seconds). For the example illustrated in FIG. 9, the first refined search interval is in excess of the snippet threshold. As a result, the snippet search performs another iteration.

In a second iteration of the snippet search 920, Pr is selected as the midpoint between Pn and Py 804. The search jumps from Py (new) to Pr (new) 805 and a frame corresponding to Pr is presented to a user. Here the user responds that the object is not visible in the frame 807. As a result, Pr is assigned as the new Pn and a new Tr is created by eliminating the portion (one-half) of Tr that did not include the object's placement. The new Tr is compared to the snippet threshold and Tr is found longer than the snippet threshold. As a result, the snippet search iterates again.

In a third iteration of the snippet search 930, Pr is selected as the midpoint between Pn and Py. The search jumps from Pn to Pr and a frame corresponding to Pr is presented to a user. Here the user responds that the object is not visible. As a result, Pn is moved to Pr and the refined search interval is again shortened. The new Tr is compared to the snippet threshold and found to be less than or equal to the snippet threshold. At this point the snippet search ends and a video snippet 940 corresponding to the last Tr is provided to the GUI for viewing 814.

Because only the length of the refined search interval determines when the snippet search ends, the object need not be known to the search algorithm. To protect the search from returning a snippet with the object's placement located at one extreme of the Tr, the snippet threshold may be adjustable.

The video snippet created using Tr may be a video file created (e.g., automatically) by copying the video stream between the time stamps of Pn and Py for the Tr returned by the snippet search. This video file may be stored for later review. In a possible embodiment, the video file may also be transmitted to another user (e.g., security personnel) automatically.

Creating a video snippet using Tr may, may include automatically adding start and stop points to the slider 327 and moving the play head 328 between the start and stop points. In this case, the user may play the video (e.g., repeatedly in a loop) between the start and stop points added to the slider. In some cases, the user may also adjust the start and stop points on the slider to refine the video snippet (e.g., center the point at which the object was placed or displaced, expand the refined search interval, shorten the refined search interval, etc.).

In still another possible embodiment, the iterative search may return a refined search interval that is used to create a plurality of video snippets from a plurality of cameras 106 in the camera network. In other words, a search may be executed using a particular video stream from a particular camera, but the results of the search may be applied to view a plurality of snippets from other cameras in addition to the particular camera. This feature may be useful when an area is covered by a plurality of cameras. In a possible embodiment a user may "link" cameras to a particular search (e.g., through a dialog at the beginning of the search) so that video snippets from the linked cameras are returned in addition to the video snippet returned for the particular camera.

In another possible embodiment, the time stamps of the end points of the refined search interval are returned by the snippet search in addition to (or in place of) the video snippet. The time stamps may be recorded (e.g., with the video snippet) or used for other operations. For example, the time stamps may be used to search a database for other security data (e.g., data collected from mobile phones in the area corresponding to the camera and at a time corresponding to the interval).

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for searching video from a camera in a surveillance system for a snippet of video showing an object's placement or displacement, the method comprising:
   providing a graphical user interface (GUI) for a user to interact with a video stream from the camera in the video surveillance system;
   presenting the video stream to a user via the GUI;
   receiving a selection from a user via the GUI wherein the selection is for (i) a search of the video stream for an object's placement or (ii) a search of the video stream for an object's displacement;
   performing an iterative search of the video stream using a plurality of iterations, wherein each iteration of the plurality of iterations comprises:
      choosing a point in the video stream based on an initial search interval for a first iteration and based on a refined search interval for subsequent iterations,
      presenting, in the GUI, a frame from the point in the video stream along with a dialog asking if the object is visible in the frame,
      receiving an input from the user via the GUI indicating that the object is visible or not visible in the frame,
      ruling in or out a segment of the video stream based on the input from the user,
      generating a refined search interval based on the ruling in or out the segment, and
      comparing the refined search interval to a snippet threshold and continuing the iterative search when the snippet threshold is exceeded; and
   presenting, as a result of the iterative search ending when the refined search interval is less than or equal to the snippet threshold, a video snippet of the video stream in the GUI, the video snippet corresponding to the refined search interval and showing the object's placement or displacement.

2. The method according to claim 1, wherein the object is not selected for the iterative search.

3. The method according to claim 2, wherein the input from the user indicating that the object is visible or not visible determines the results of the iterative search.

4. The method according to claim 1, wherein the iterative search comprises an initial-interval search followed by a snippet search, and wherein:
   the initial-interval search returns the initial search interval that specifies a portion of the video stream including the object's placement or displacement, and wherein:
   the snippet search returns the refined search interval that specifies a portion of the video stream that is (i) smaller than the portion specified by the initial search interval and (ii) includes the object's placement or displacement.

5. The method according to claim 4, wherein:
for the search of the video stream for an object's placement, the initial-interval search begins at the current point in the video stream and iterates by successively jumping backwards in the video stream until the input from the user via the GUI indicates that the object not visible in the frame, and wherein:
for search the video stream for an object's displacement, the initial-interval search begins at the current point in the video stream and iterates by successively jumping backwards in the video stream until the input from the user via the GUI indicates that the object is visible in the frame.

6. The method according to claim 5, wherein each successive jump backwards in the initial-interval search is successive and is twice the length of the previous iteration's jump backwards.

7. The method according to claim 6, wherein the initial search interval returned by the initial-interval search comprises the portion of the video stream spanned by the final jump in the succession of jumps.

8. The method according to claim 4, wherein the snippet search begins at an endpoint of the initial search interval and iterates by successively reducing the initial search interval based on the input from a user until a refined search interval is returned that is equal to or less than the snippet threshold.

9. The method according to claim 8, wherein each iteration of the snippet search returns a refined search interval that is one half the length of the previous iteration's search interval.

10. The method of claim 9, wherein the refined search interval returned by the final iteration of the snippet search determines the video snippet presented in the GUI.

11. A video surveillance system comprising:
   a network of video cameras;
   a recorder that records video streams from the cameras; and
   a computing device communicatively coupled to the network of video cameras and to the recorder, wherein the computing device is configured by software to:
      present a video stream from a camera in the network of video cameras to a user via the GUI;
      receive a selection from a user via the GUI, wherein the selection is for (i) a search of the video stream for an object's placement or (ii) a search the video stream for an object's displacement;
      perform an iterative search of the video stream using a plurality of iterations,
         wherein each iteration of the plurality of iterations comprises:
            choosing a point in the video stream based on an initial search interval for a first iteration and based on a refined search interval for subsequent iterations,
            presenting, in the GUI, a frame from the point in the video stream along with a dialog asking if the object is visible in the frame,
            receiving an input from the user via the GUI indicating that the object is visible or not visible in the frame,
            ruling in or out a segment of the video stream based on the input from the user,
            generating a refined search interval based on the ruling in or out the segment, and
            comparing the refined search interval to a snippet threshold and continuing the iterative search when the snippet threshold is exceeded; and
      present, as a result of the iterative search ending when the refined search interval is less than or equal to the snippet threshold, a video snippet of the video stream in the GUI, the video snippet showing the object's placement or displacement.

12. The video surveillance system according to claim 11, wherein the object is not selected for the iterative search.

13. The video surveillance system according to claim 12, wherein the input from the user indicating that the object is visible or not visible determines the results of the iterative search.

14. The video surveillance system according to claim 11, wherein the iterative search comprises an initial-interval search followed by a snippet search, and wherein:
the initial-interval search returns the initial search interval that specifies a portion of the video stream including the object's placement or displacement, and wherein:
the snippet search returns the refined search interval that specifies a portion of the video stream that is (i) smaller than the portion specified by the initial search interval and (ii) includes the object's placement or displacement.

15. The video surveillance system according to claim 14, wherein:
for the search of the video stream for an object's placement, the initial-interval search begins at the current point in the video stream and iterates by successively jumping backwards in the video stream until input from the user via the GUI indicates that the object not visible in the frame, and wherein:
for search the video stream for an object's displacement, the initial-interval search begins at the current point in the video stream and iterates by successively jumping backwards in the video stream until input from the user via the GUI indicates that the object is visible in the frame.

16. The video surveillance system according to claim 15, wherein each successive jump backwards in the initial-interval search is twice the length of the previous iteration's jump backwards.

17. The video surveillance system according to claim 16, wherein the initial search interval returned by the initial-interval search comprises the portion of the video stream spanned by the final jump in the succession of jumps.

18. The video surveillance system according to claim 14, wherein the snippet search begins at an endpoint of the initial search interval and iterates by successively reducing the initial search interval based on the input from a user until a refined search interval is found that is equal to or less than the snippet threshold.

19. The video surveillance system according to claim 18, wherein each iteration of the snippet search returns a refined search interval that is one half the length of the previous iteration's search interval.

20. The video surveillance system according to claim 19, wherein the refined search interval returned by the final iteration of the snippet search determines the video snippet presented in the GUI.

* * * * *